United States Patent
Barros et al.

(10) Patent No.: US 11,442,608 B1
(45) Date of Patent: Sep. 13, 2022

(54) PRESERVING ENGAGEMENT STATE BASED ON CONTEXTUAL SIGNALS

(71) Applicant: Google LLC, Mountain View, CA (US)

(72) Inventors: Brett Aladdin Barros, San Mateo, CA (US); Theophile Vincent Goguely, Mill Valley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/444,656

(22) Filed: Aug. 6, 2021

(51) Int. Cl.
*G06F 3/04845* (2022.01)
*G06F 3/01* (2006.01)

(52) U.S. Cl.
CPC .......... *G06F 3/04845* (2013.01); *G06F 3/011* (2013.01); *G06F 3/017* (2013.01)

(58) Field of Classification Search
CPC ...... G06F 3/04845; G06F 3/011; G06F 3/017; G06F 1/3231; G01S 17/04
See application file for complete search history.

(56) References Cited

U.S. PATENT DOCUMENTS

| | | | |
|---|---|---|---|
| 8,601,301 B1 * | 12/2013 | Arscott | G06F 1/3203 713/320 |
| 2017/0289766 A1 * | 10/2017 | Scott | H04W 4/023 |
| 2019/0174419 A1 | 6/2019 | Schillings et al. | |
| 2020/0372879 A1 | 11/2020 | Giusti et al. | |
| 2021/0026434 A1 | 1/2021 | Giusti et al. | |

* cited by examiner

*Primary Examiner* — Andrey Belousov
(74) *Attorney, Agent, or Firm* — Honigman LLP; Brett A. Krueger; Grant Griffith

(57) ABSTRACT

A method for dynamically changing a graphical user interface element occurs in response to detecting that a temporal user interface element displayed on a user interface of user device. The method includes receiving, at the user device, a contextual signal characterizing a state of a user. The method further includes determining, by the user device, that the contextual signal characterizing the state of the user is indicative of the user intending to interact with a temporal user interface element. The methods also include, in response to determining that the contextual signal characterizing the state of the user is indicative of the user intending to interact with a temporal user interface element, modifying a respective state of the temporal user interface element displayed on the user interface of the user device.

28 Claims, 6 Drawing Sheets

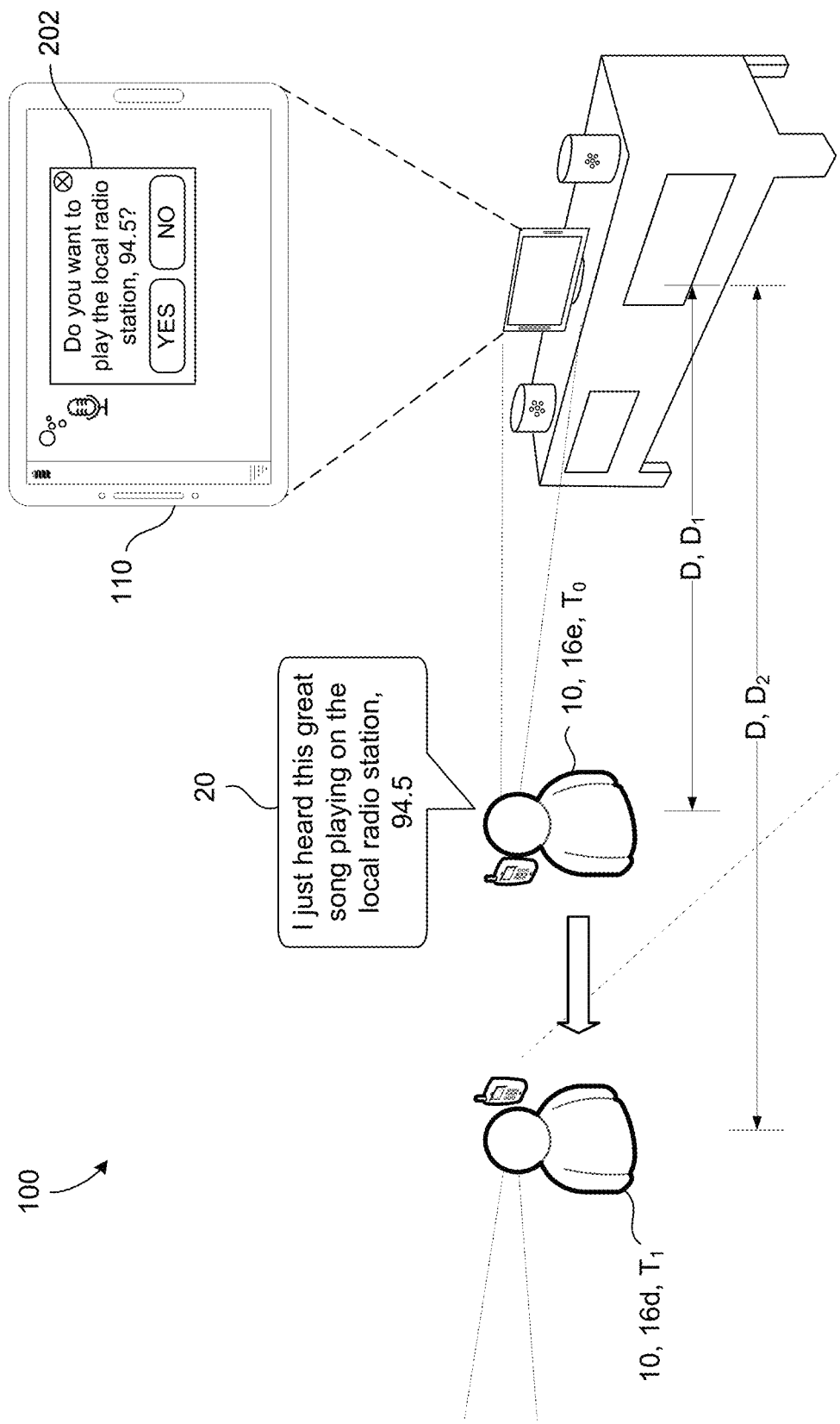

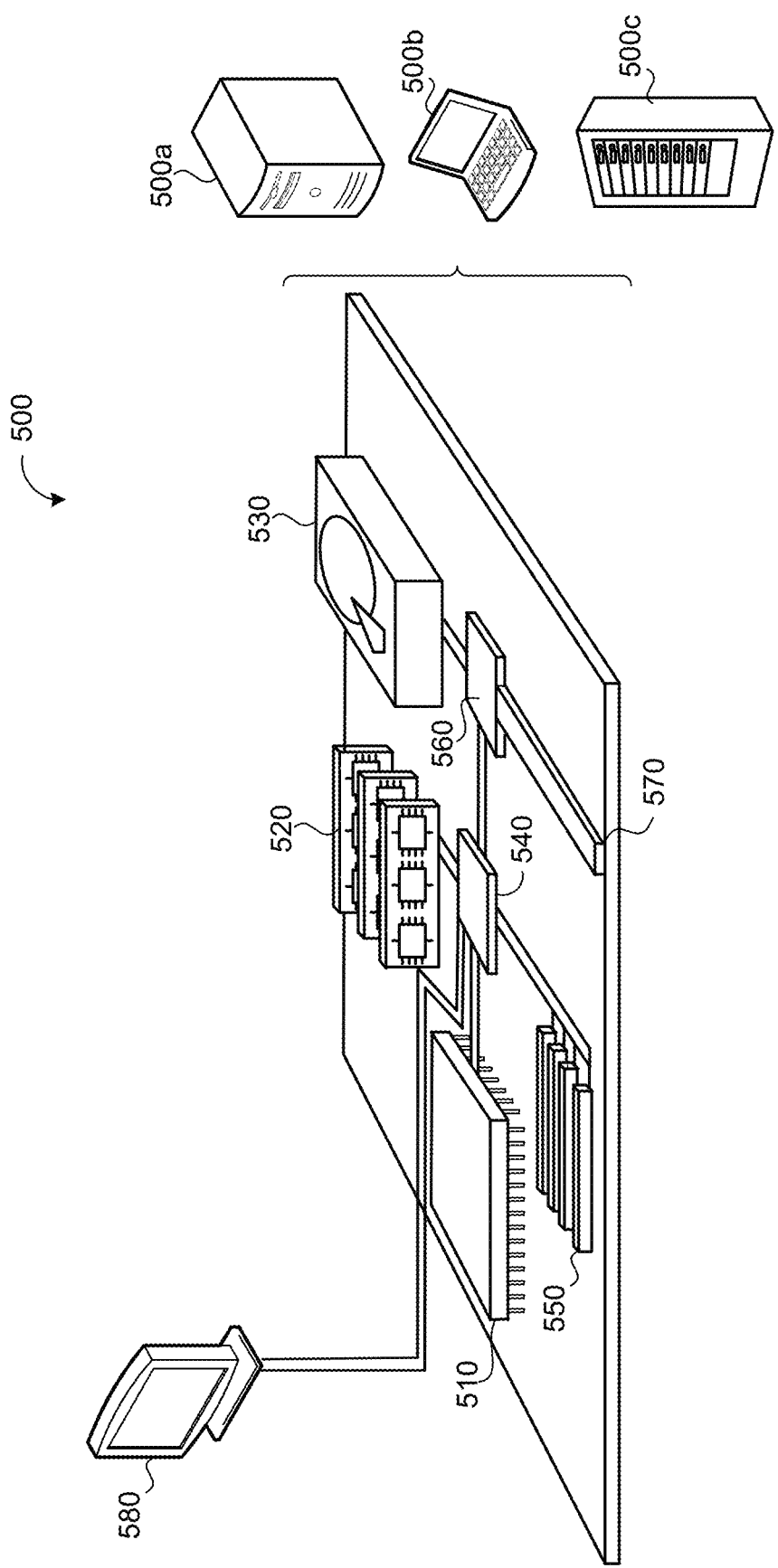

PRESERVING ENGAGEMENT STATE BASED ON CONTEXTUAL SIGNALS

TECHNICAL FIELD

This disclosure relates to preserving an engagement state based on contextual signals.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Once awake, the devices can proceed to perform more expensive processing such as full on-device automated speech recognition (ASR) or server-based ASR.

SUMMARY

One aspect of the disclosure provides a computer-implemented method for dynamically changing a graphical user interface element. The computer-implemented method, when executed by data processing hardware, causes the data processing hardware to perform operations. The operations occur in response to detecting that a temporal user interface element displayed on a user interface of user device. The operations include receiving, at the user device, a contextual signal characterizing a state of a user. The operations further include determining, by the user device, that the contextual signal characterizing the state of the user is indicative of the user intending to interact with a temporal user interface element. The operations also include, in response to determining that the contextual signal characterizing the state of the user is indicative of the user intending to interact with a temporal user interface element, modifying a respective state of the temporal user interface element being displayed on the user interface of the user device.

Another aspect of the disclosure provides a system for dynamically changing a graphical user interface element. The system includes data processing hardware and memory hardware in communication with the data processing hardware. The memory hardware stores instructions that when executed on data processing hardware cause the data processing hardware to perform operations. The operations occur in response to detecting that a temporal user interface element displayed on a user interface of user device. The operations include receiving, at the user device, a contextual signal characterizing a state of a user. The operations further include determining, by the user device, that the contextual signal characterizing the state of the user is indicative of the user intending to interact with a temporal user interface element. The operations also include, in response to determining that the contextual signal characterizing the state of the user is indicative of the user intending to interact with a temporal user interface element, modifying a respective state of the temporal user interface element displayed on the user interface of the user device Implementations of either aspect of the disclosure may include one or more of the following optional features. In some implementations, the state of the user includes an engagement state indicative of the user attempting to engage or engaging with the temporal user interface element displayed on the user interface of the user device. In some examples, modifying the respective state of the oral user interface element includes increasing or suspending a timeout duration of the temporal user interface element. In some configurations, the state of the user includes a disengagement state indicative of a user disengaging with the temporal user interface element displayed on the user interface of the user device. In these configurations, in response to determining that the contextual signal characterizing the state of the user includes the disengagement state, modifying the respective state of the temporal user interface element may include removing the temporal user interface element prior to the expiration of a timeout duration for the temporal user interface element. In these configurations, in response to determining that the contextual signal characterizing the state of the user includes the disengagement state, modifying the respective state of the temporal user interface element may include decreasing a timeout duration of the temporal user interface element. Some examples of the contextual signal include a user proximity signal indicating a proximity to the user relative to the user device, a presence detection signal indicating a presence of the user within the field of view of a sensor associated with the user device, and an attention detection signal indicating an attention of the user with respect to the user device. The temporal user-interface element may represent an action specified by a query detected in streaming audio captured by the user device. Optionally, the operations further include, in response to determining that the contextual signal characterizing the state of the user is indicative of the user intending to interact with the temporal user-interface element and prior to modifying the respective state of the temporal user-interface element being displayed on the user interface of the user device, determining that the respective state of the temporal user-interface element has failed to have been previously modified a threshold number of times within a period of time.

In some examples of either aspect of the disclosure, the contextual signal includes a presence detection signal indicating a presence of the user within the field of view of a sensor associate with the user device. Here, determining that the contextual signal characterizing the state of the user is indicative of the user intending to interact with a temporal user interface element includes determining that the presence detection signal indicates that the presence of a user within the field of view of the sensor has changed from not present to present and modifying the respective state of the temporal user interface element being displayed on the user interface includes increasing a timeout duration or suspending the timeout duration of the temporal user interface element.

In some implementations of either aspect of the disclosure, the contextual signal includes a user proximity signal indicating a proximity of the user relative to the user device. Here, determining that the contextual signal characterizing the state of the user is indicative of the user intending to interact with the temporal user-interface element includes determining that the user-proximity signal indicates that the proximity of the user relative to the user device has changed to be closer to the user device and modifying the respective state of the temporal user-interface element being displayed on the user interface includes increasing a timeout duration or suspending the timeout duration of the temporal user-interface element.

In some configurations of either aspect of the disclosure, the contextual signal includes an attention detection signal indicating an attention of the user with respect to the user device. Here, determining that the contextual signal characterizing the state of the user is indicative of the user intending to interact with the temporal user-interface element includes determining that the attention detection signal indicates that the attention of the user has changed to focus on the user device and modifying the respective state of the temporal user-interface element being displayed on the user interface includes increasing a timeout duration or suspending the timeout duration of the temporal user-interface element.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a schematic view of example speech-enabled environments using the preserver.

FIG. 5 is a schematic view of an example computing device that may be used to implement the systems and methods described herein.

Like reference symbols in the various drawings indicate like elements.

DETAILED DESCRIPTION

Figure 1:
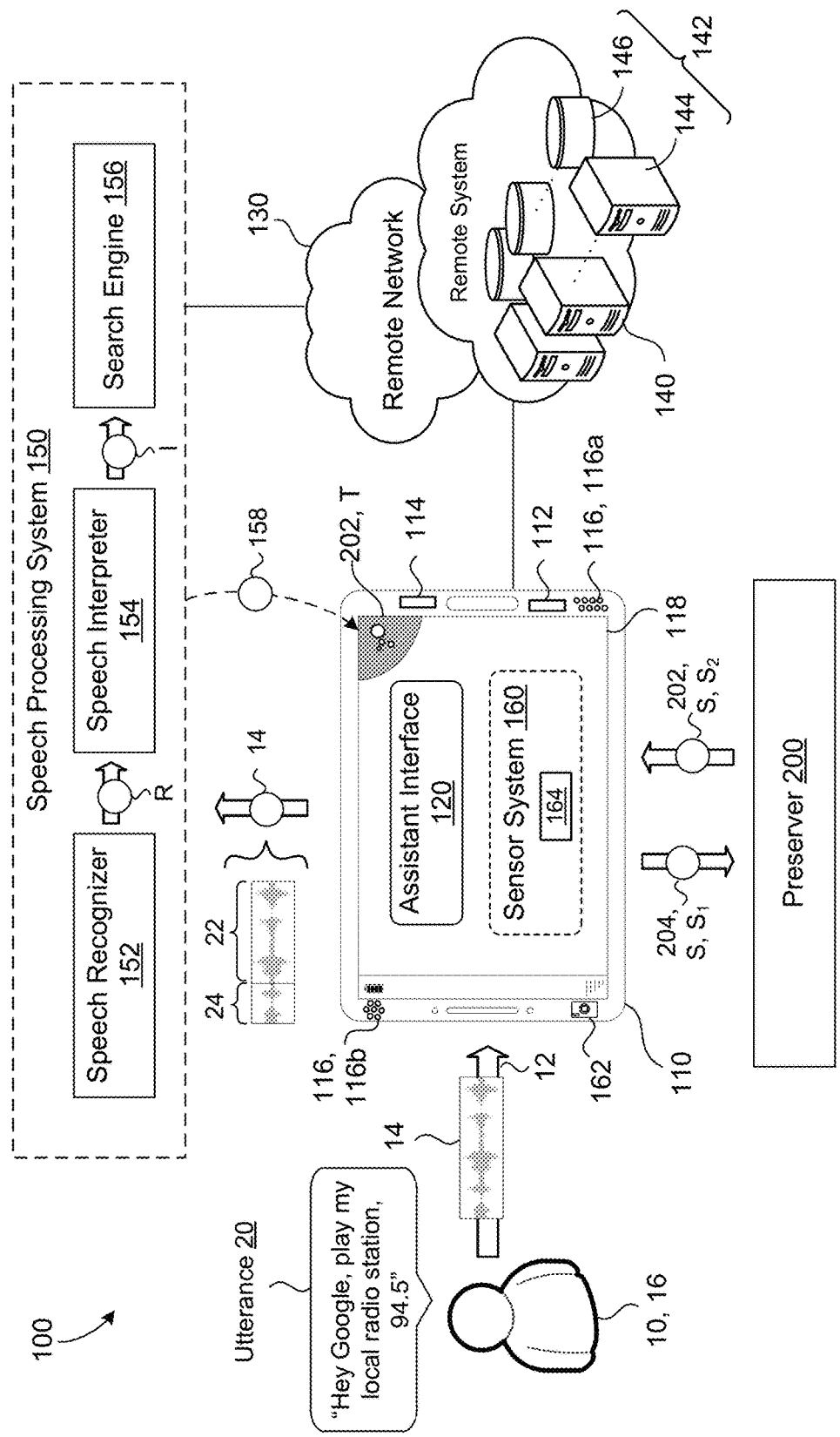
FIG. 1 is a schematic view of an example speech-enabled environment.

A voice-enabled device (e.g., a user device executing a voice assistant) allows a user to speak a query or a command out loud and field an answer for the query and/or perform a function based on the command. Often, when the voice-enabled device responds to the query, the voice-enabled device generates a visual response that represents an action requested by the query. For instance, a user of the voice-enabled device speaks an utterance requesting that the voice-enabled device plays a particular song on a music streaming application of the voice-enabled device. In response to this request by the user, the voice-enabled device displays a graphical element on a display associated with the voice-enabled device that indicates that the voice-enabled device is playing the requested song on the music streaming application associated with a music streaming service.

In certain situations, the graphical element is temporary or temporal in nature such that the graphical element is removed from the display of the voice-enabled device after a particular amount of time. That is, the graphical element may have a set timeout value where the timeout value refers to a duration that the graphical element will visually exist before being removed (i.e., timing-out). For example, the graphical element is a temporary notification that visually indicates the action that the voice-enabled device is performing or can perform in response to the query by the user.

In some examples, the voice-enabled device does not perform the action in response to the query until the user associated with the voice-enabled device somehow confirms that the user wants the action to be performed. Here, the confirmation may be a verbal confirmation (e.g., "Yes") such as a speech input, a motion confirmation such as a gesture, or tactile confirmation such as the user tapping the display of the voice-enabled device to affirm performance of the action. In using a confirmation approach, the confirmation approach may prevent a voice-enabled device from inadvertently performing an action that is not desired by the user. Moreover, this approach allows the voice-enabled device to suggest one or more actions that the voice-enabled device perceived that the user requested and for the user to select or indicate if any of the actions were actually requested by the user (i.e., any actions that the user intended for the voice-enabled device to perform).

In some implementations, the voice-enabled device suggests an action in response to a query by the user rather than automatically performing the action because the voice-enabled device lacks confidence that the user actually requested that the action be performed. For instance, one user is having a conversation with another user in proximity to the voice-enabled device and the voice-enabled device perceives that some aspect of the conversation was a query for the voice-enabled device to perform an action. Yet because this is a side speech conversation that is not directed to the voice-enabled device, the voice-enabled device may not determine the action with a particular level of confidence to automatically perform the action. Here, due to a lower confidence that does not satisfy automatic performance of the action, the voice-enabled device instead displays a graphical element that inquires whether the user wants to perform the detected action. For instance, the voice-enabled device displays a prompt that states, "Do you want me to play Thriller, by Michael Jackson?" This prompt therefore gives the user the ability to confirm that is what the user intended (i.e., a selectable "yes" button in the prompt) or gives the user the ability to indicate that was not what the user intended (i.e., a selectable "no" button in the prompt). Here, the prompt may be setup as a temporal graphical element which allows the user to ignore the prompt or fail to be aware of the prompt and not cause the action suggested by the prompt to be performed. In other words, if the voice-enabled device does not receive any input from the user regarding the prompt, the prompt and therefore the suggested action will timeout and not occur.

Unfortunately, situations occur where the user did request that a particular action be performed by the voice-enabled device, but the user is unable to provide confirmation that the user wants the action to be performed. To illustrate, a voice-enabled device may be located in a kitchen of the user's home. When the user returns home from the grocery store, the user then begins to carry groceries into the kitchen in a series of trips from his or her car. While in the kitchen initially, the user requests that the voice-enabled device play a local radio station that the user was listening to on the way home from the grocery store. In this scenario, although the user explicitly requested that the voice-enabled device play the local radio station, the user may have been moving and turning such that the voice-enabled device did not confidently detect the command. Due to this lack of confidence, the voice-enabled device generates a prompt that inquires whether the user wants the voice-enabled device to play the local radio station. Even though this suggested action is indeed what the user requested, the user may fail to see the prompt and become frustrated that the voice capabilities of the voice-enabled device are underperforming. Alternatively, the user may return from a trip to the car with arms full of groceries only to notice that the local radio station is not playing and a prompt is present as a temporal graphical element on the display of the voice-enabled device. Yet before the user can set the groceries down or has a chance to verbally respond, the prompt may disappear (i.e., timeout). In this example, prior to the prompt/suggested action timing out, the user may have been moving toward voice-enabled device to tap yes on the prompt.

For situations like the grocery example, a state of the temporal graphical element may benefit from being aware of a state of the user. That is, in the grocery example, the user was moving toward the voice-enabled device as the prompt disappeared (i.e., timed-out). Meaning that, if some system associated with voice-enabled device recognized the state of the user as attempting to interact with the voice-enabled device, that system may inform the voice-enabled device (or some system thereof) to extend the timeout duration of the temporal graphical element (e.g., the prompt asking whether the user wanted to play the local radio station). Accordingly, if the timeout duration was extended due to the state of the user, the user may have enough time to input confirmation of the action at the voice-enabled device; resulting in the voice-enabled device successfully playing the local radio station to the enjoyment of the user.

In contrast, if, in the grocery example, the user came into the kitchen carrying groceries and talking on his or her cell phone saying, "I just heard this great song playing on the local radio station," the temporal graphical element may also benefit from being aware of the state of the user to accelerate its timeout or timeout immediately (i.e., change the state of the temporal element). For instance, in this alternative to the example, the user may stare at the voice-enabled device noticing that the voice-enabled device generated a prompt to play the local radio station and then walk away to continue bringing in groceries. Here, the visual recognition of the user (i.e., the stare) combined with then walking away may inform the voice-enabled device to timeout the prompt immediately due to the implicit lack of interest in the suggested action by the user.

In order for the temporal element to be aware of the state of the user, one or more systems associated with the voice-enabled device may be configured to analyze contextual signals to determine whether one or more of these signals indicate that the state of the user should impact the state of the temporal element. In other words, if contextual signal(s) characterize the state of the user as attempting to positively interact (i.e., an engagement state) with the voice-enabled device (e.g., attempting to engage), the state of the temporal element may be modified to accommodate for the positive interaction (e.g., the timeout is extended or suspended entirely). On the other hand, if contextual signal(s) characterize the state of the user as attempting to negatively interact (i.e., a disengagement state) with the voice-enabled device (e.g., to not engage), the state of the temporal element may be modified to accommodate for the negative interaction (e.g., the timeout is reduced or executed immediately). With this approach, temporal elements may be preserved when contextual signals (e.g., collected/received sensor data) justify their preservation.

Referring to FIG. 1, in some examples, a speech environment 100 includes a user 10 speaking an utterance 20 within an audible range of a voice-enabled device 110 (also referred to as a device 110 or a user device 110) executing a digital assistant interface 120. Here, the utterance 20 spoken by the user 10 may be captured by the device 110 in the streaming audio 12 and may correspond to a query 22 to perform an action, or more specifically, a query 22 for the digital assistant interface 120 to perform the action. The user 10 may prefix the query 22 with a hotword 24 (e.g., invocation phrase) to trigger the device 110 from a sleep or hibernation state when a hotword 24 is detected in the streaming audio 12 by a hotword detector (e.g., the soft acceptor 200) running on the device 110 while in the sleep or hibernation state. The user 10 may also endpoint the query 22 with the hotword 24. Other techniques may be used to trigger the device 110 from a sleep or hibernation state other than speaking a hotword 24. For instance, invocation events may trigger the device 110 from the sleep or hibernation state. Invocation events may include, without limitation, the user providing a gesture before or while speaking the query 22, the user facing the device when speaking the query 22, the user suddenly entering the presence of the device 110 and speaking the query 22, or contextual cues indicating a likelihood that speech (e.g., a query 22) is expected to be directed toward the device 110. The action may also be referred to as an operation or task. In this sense, the user 10 may have conversational interactions with the digital assistant interface 120 executing on the voice-enabled device 110 to perform computing activities or to find answers to questions.

The device 110 may correspond any computing device associated with the user 10 and capable of capturing audio from the environment 100. In some examples, user devices 110 include, but are not limited to, mobile devices (e.g., mobile phones, tablets, laptops, e-book readers, etc.), computers, wearable devices (e.g., smart watches), music players, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to speech processing.

The device 110 further includes an audio subsystem 116 with an audio capturing device 116, 116a (e.g., an array of one or more microphones) for capturing and converting audio within the speech environment 100 into electronic signals (e.g., audio data 14). While the device 110 implements the audio capturing device 116a (also referred to generally as a microphone 116a) in the example shown, the audio capturing device 116a may not physically reside on the device 110, but be in communication with the audio subsystem 116 (e.g., peripherals of the device 110). For example, the device 110 may correspond to a vehicle infotainment system that leverages an array of microphones positioned throughout the vehicle. In another example, the audio capturing device 116a may reside on another device in communication with the user device 110 that is to perform the action. Additionally, the audio subsystem 116 may include a playback device 116, 116b (e.g., such as one or more speakers 116b) for playing back audio generated/output by the user device 110 (e.g., synthetic audio, synthetic speech, or audio relating to various types of media).

The device 110 may also include a display 118 to display graphical user interface (GUI) elements (e.g., a graphical user-interface element 202) and/or graphical content. Some examples of GUI elements include windows, screens, icons, menus, etc.

For example, the device 110 may load or launch applications (local or remote applications) that generate GUI elements (e.g., such as the GUI element 202) or other graphical content for the display 118. Moreover, the elements generated in the display 118 may be selectable by the user 10 and also serve to provide some form of visual feedback to processing activities and/or operations occurring on the device 110. For example, the element(s) represent an action that the device 110 is performing or suggesting to perform in response to a query 22 from the user 10. Furthermore, since the device 110 is a voice-enabled device 110, the user 10 may interact with elements generated on the display 118 using various voice commands as well as other types of commands (e.g., gesture commands or touch input commands). For instance, the display 118 may depict a menu of options for a particular application and the user 10 may use the interface 120 to select an option through speech or other means of feedback (e.g., tactile input, motion/gesture input, etc.). When the user 10 speaks to select a presented option, the device 110 may be operating in a reduced speech recognition state or using a warm word model associated with the device 110 to determine if particular phrases are spoken to select the presented option. As an example, a warm word model operates to detect binary speech (e.g., "yes" or "no") during the time (e.g., during a timeout window) when an option is being presented by the device 110 (e.g., on the display 118 of the device 110).

The speech-enabled interface (e.g., a digital assistant interface) 120 may field the query 22 or the command conveyed in the spoken utterance 20 captured by the device 110. The speech-enabled interface 120 (also referred to as interface 120 or an assistant interface 120) generally facilitates receiving audio data 14 corresponding to an utterance 20 and coordinating speech processing on the audio data 14 or other activities stemming from the utterance 20. The interface 120 may execute on the data processing hardware 112 of the device 110. The interface 120 may channel audio data 14 that includes an utterance 20 to various systems related to speech processing or query fulfillment.

Furthermore, the device 110 is configured to communicate via a network 130 with a remote system 140. The remote system 140 may include scalable remote resources 142, such as remote data processing hardware 144 (e.g., remote servers or CPUs) and/or remote memory hardware 146 (e.g., remote databases or other storage hardware). The device 110 may utilize the remote resources 142 to perform various functionality related to speech processing (e.g., by the speech processing system 150) and/or state preservation of a GUI element (e.g., by the preserver 200). For instance, the device 110 is configured to perform speech recognition using a speech recognition system 152 and/or speech interpretation using a speech interpreter 154. In some examples, although not shown, the device 110 may additionally convert text-to-speech (TTS) during speech processing using a TTS system.

The device 110 is also configured to communicate with the speech processing system 150. The speech processing system 150 is generally able to perform various functionality related to speech processing such as speech recognition and speech interpretation (also known as query interpretation). For instance, the speech processing system 150 of FIG. 1A is shown to include a speech recognizer 152 that performs automated speech recognition (ASR), a speech interpreter 154 that determines the meaning of the recognized speech (i.e., to understand the speech), and a search engine 156 to retrieve any search results in response to a query identified in the recognized speech. When a hotword detector (e.g., associated with the assistant interface 120) detects a hotword event, the hotword detector passes the audio data 14 to the speech processing system 150. The hotword event indicates that the hotword detector accepts a portion of the audio data 14 (e.g., the first audio segment) as a hotword 24. With a portion of the audio data 14 identified as a hotword 24, the hotword detector and/or the assistant interface 120 communicates the audio data 14 as a hotword event such that the speech processing system 150 can perform speech processing over the audio data 14. By performing speech processing over the audio data 14, the speech recognizer 152 in combination with the speech interpreter 154 is able to determine whether a second audio segment (e.g., shown as the query 22) of the audio data 14 is indicative of a spoken query-type utterance.

A speech recognizer 152 receives audio data 14 corresponding to a hotword event as input and transcribes the audio data 41 into a transcription as an output referred to as a speech recognition result R. Generally speaking, by converting audio data 14 into a transcription, the speech recognizer 152 allows the device 110 to recognize when a spoken utterance 20 from the user 10 corresponds to a query 22 (or command), or some other form of audio communication. The transcription refers to a sequence of text that the device 110 (e.g., the assistant interface 120 or the speech processing system 150) may then use to generate a response to the query or the command. The speech recognizer 152 and/or the interface 120 may provide the speech recognition result R to the speech interpreter 154 (e.g., a natural language understand (NLU) module) to perform semantic interpretation on the result R to determine whether the audio data 14 includes a query 22 requesting a particular action 158 to be performed. In other words, the speech interpreter 154 generates an interpretation I of the result R in order to identify the query 22 or command in the audio data 14 and to allow the speech processing system 150 to respond to the query 22 with a corresponding action 158 invoked by the query 22. For instance, if the query 22 is a command to play music, the corresponding action 158 invoked by the query 22 is to play the music (e.g., by executing an application that is capable of playing music). In some examples, the speech processing system 150 employs a search engine 156 to retrieve search results that enable the speech processing system 150 to respond to the query 22 (i.e., fulfill the query 22).

The user device 110 also includes or is associated with a sensor system 160 configured with sensors 162 to capture sensor data 164 within the environment of the user device 110. The user device 110 may continuously, or at least during periodic intervals, receive the sensor data 164 captured by the sensor system 160 to determine a current state 16 of the user 10 of the user device 110. Some examples of sensor data 164 include motion data, image data, connection data, noise data, speech data, or other data indicative of a state 16 of the user 10/user device 110 or state of the environment in the vicinity of the user device 110. Motion data may include accelerometer data that characterizes movement of the user 10 via movement of the user device 110. For instance, the user 10 is holding the device 110 and, when the user 10 moves her thumb to tap the display 118 of the device 110 (e.g., to interact with a GUI element), the motion data indicates that the state 16 of the user 10 is engaging with the device 110. Motion data could also be received at the device 110 from another device associated with the user such as smart phone in the user's pocket or a smart watch worn by the user. Image data may be used to detect an attention of the user 10, a proximity of the user 10 with respect to the user device 110 (e.g., a distance between the user 10 and the user device 110), a presence of the user 10 (e.g., is the user 10 present or not within a field of view of one or more sensor 162), and/or features of the environment of the user 10. For example, the image data detects the attention of the user 10 by capturing features of the user 10 (e.g., to characterize a gesture of the user 10 by body features, to characterize a gaze of the user 10 by facial features, or to characterize a pose/orientation of the user 10). Connection/communication data may be used to determine whether the user device 110 is connected to or in communication with other electronics or devices (e.g., a smart watch or a mobile phone). For instance, the connection data may be near-field connection/communication data, Bluetooth connection/communication data, Wi-Fi connection/communication data, or some other radio band connection/communication data (e.g., ultra-wideband (UWB) data). Acoustic data, such as noise data or speech data, may be captured by the sensor system 160 (e.g., a microphone 116a of the device 110) and used to determine the environment of the user device 110 (e.g., characteristics or properties of the environment that have particular acoustic signatures) or identify whether the user 10 or another party is speaking. In some configurations, the sensor system 160 captures ultrasonic data to detect a location of the user 10 or other objects within the environment of the device 110. For instance, the device 10 leverages the combination of its speaker(s) 116b and its microphone(s) 116a to capture ultra-sound data for the environment of the device 110. The sensor(s) 162 of the sensor system 160 may be embedded or hosted on-device (e.g., a camera that captures image data or a microphone 116a that captures acoustic data), reside off-device, but in communication with the device 110, or some combination thereof. Although FIG. 1A depicts a camera included on the device 110 as an example sensor 162, other peripherals of the device 110 may also function as sensors 162, such as the microphone 116a and the speaker 116b of the audio subsystem 116.

Systems 150, 160, 200 may reside on the device 110 (referred to as on-device systems) or reside remotely (e.g., reside on the remote system 140), but in communication with the device 110. In some examples, some of these systems 150, 160, 200 reside locally or on-device while others reside remotely. In other words, any of these systems 150, 160, 200 may be local or remote in any combination. For instance, when a system 150, 160, 200 is rather large in size or processing requirements, the system 150, 160, 200 may reside in the remote system 140. Yet when the device 110 may support the size or the processing requirements of one or more systems 150, 160, 200, the one or more systems 150, 160, 200 may reside on the device 110 using the data processing hardware 112 and/or the memory hardware 114. Optionally, the one or more of the systems 150, 160, 200 may reside on both locally/on-device and remotely. For instance, one or more of the systems 150, 160, 200 may default to execute on the remote system 140 when a connection to the network 130 between the device 110 and remote system 140 is available, but when the connection is lost or the network 130 is unavailable, the systems 150, 160, 200 instead execute locally on the device 110.

The preserver 200 generally functions as a system to dynamically adapt a state S of a GUI element (also referred to as a user-interface (UI) element) being displayed on the user device 110 (e.g., a user interface such as the display 118 of the device 110). The state S of a GUI element broadly refers to properties of the GUI element. That is, the state S of the GUI element may refer to a location of the GUI element, an amount of time that the GUI element is presented (i.e., the timeout value), and/or characteristics of graphics associated with the GUI element (e.g., color, typeface, font, style, size, etc.). In this respect, changing the state S of the GUI element includes, for example, changing a size of the GUI element, changing the location of the GUI element within the display, changing the time that the GUI element is presented, changing the font of the GUI element, changing the content of the GUI element (e.g., changing the text or media content of the GUI element), etc. Although the preserver 200 is capable of adapting the state S of any GUI element, the examples herein more specifically illustrate the preserver 200 changing the state S of a temporal GUI element 202. A temporal GUI element 202 is a graphical element that is temporary in nature. For example, the temporal GUI element 202 includes a timeout value which designates a time T that the temporal GUI element will exist (e.g., be displayed) before being removed or automatically dismissed.

While examples herein refer to a temporal GUI element displayed on a display 118, implementations herein are equally applicable to presenting a temporal element through non-graphical interfaces such as flashing a light and/or audible output of a sound (e.g., beep/chime). The user may interact with the this type of non-graphical interface element 202 via pressing a physical button on the device, providing a voice input, or performing a gesture.

To identify if and when the preserver 200 should change (i.e., dynamically adapt) the state S of the temporal GUI element 202 being displayed on the user device 110, the preserver 200 is configured to receive or to monitor contextual signals 204 accessible to the device 110. In some examples, the sensor data 164 captured by the sensor system 160 serves as one or more contextual signals 204 characterizing aspects of the device's environment. The preserver 200 may use the sensor data 164 as contextual signals 204 without any further processing of the sensor data 164 or perform further processing on the sensor data 164 to generate the contextual signals 204 that characterize aspects of the device's environment. The device 110 may leverage the preserver 200 to determine whether a contextual signal 204 indicates that the user 10 is trying to interact with the temporal GUI element 202 prior to its extinction. That is, a contextual signal 204 is capable of indicating a state 16 of the user 10 where the state 16 is indicative of an engagement state where the user 10 is trying to interact with the temporal GUI element 204 or a disengagement state where the user 10 is not interacting or purposefully disengaging with the temporal GUI element 204. Depending on the state 16 of the user 10 characterized by the contextual signal 204, the preserver 200 may either preserve the temporal GUI element 202 for a longer period of time than originally designated, advance the extinction (i.e., removal) of the temporal GUI element 202, or maintain the time-based properties (e.g., the timeout value) of the temporal GUI element 202 (i.e., do not change any state S of the temporal GUI element 202).

Returning to the first grocery example, when the user 10 is moving toward the device 110, the preserver 200 may receive one or more contextual signals 204 that characterize the state 16 of the user 10 as an engagement state 16, 16e. For instance, the contextual signals 204 indicate that the proximity of the user 10 with respect to the user device 110 is changing in a manner that is making the user 10 more proximate to the user device 110 (i.e., the distance between the user 10 and the user device 110 is decreasing). Because the contextual signals 204 indicate that the state 16 of the user 10 is changing, this suggests the user 10 is trying to interact with the prompt being displayed on the user device 110. Here, the preserver 200 modifies the state S of the prompt "do you want to play the local radio station," which is a temporal GUI element 202. In this example, the preserver 200 would modify the state S of the prompt by extending or suspending the timeout duration for the prompt to enable to the user 10 to successfully interact with the prompt before it expires. Contextual signals 204 may indicate any action performed by the user that could characterize the state 16 of the user 10 in the engagement state 16e. As another example, the user 10 picking up a remote control could characterize the state of the user 10 is in the engagement state 16 to interact with a temporal GUI element 202 displayed on a television.

In contrast, when the user 10 is talking on the phone and did not command the device 110 to play the local radio station, the preserver 200 may receive one or more contextual signals 204 that characterize the state 16 of the user 10 as a disengagement state 16d. For example, as described in this version of the example, the user 10 stares at the device 110 displaying the prompt "do you want to play the local radio station" and then proceeds to turn and continue bringing in groceries. When these are the actions of the user 10, the preserver 200 may receive contextual signals 204 that characterize an attention of the user 10 as engaged with, or staring at the device 110. These contextual signals 204 are then followed by contextual signals 204 that characterize a disengagement with the device 110 (i.e., turning away from the device 110) without any action by the user 10 that indicates an attempt to engage with the temporal GUI element 202. In fact, the contextual signals 204 received by the preserver 200 would then indicate that the user 10 is decreasing her proximity with respect to the device 110 indicative of a disengagement state 16d. With these changing contextual signals 204 that overall indicate an engagement state 16e followed by a disengagement state 16d, the preserver 200 may either maintain the state S of the temporal GUI element 202 (i.e., let the prompt expire), advance the state S of the temporal GUI element 202 (i.e., shorten the timeout duration or remaining timeout duration), or change the S of the temporal GUI 202 to remove the temporal GUI element 202 immediately. In this example, the preserver 200 may interpret the contextual signals 204 as characterizing a deliberate disengagement due to a change from an engagement state 16e (e.g., a state 16 that recognizes the temporal GUI element 202) to a disengagement state 16d and promptly remove the temporal GUI element 202 once this interpretation is made.

Figure 2A:
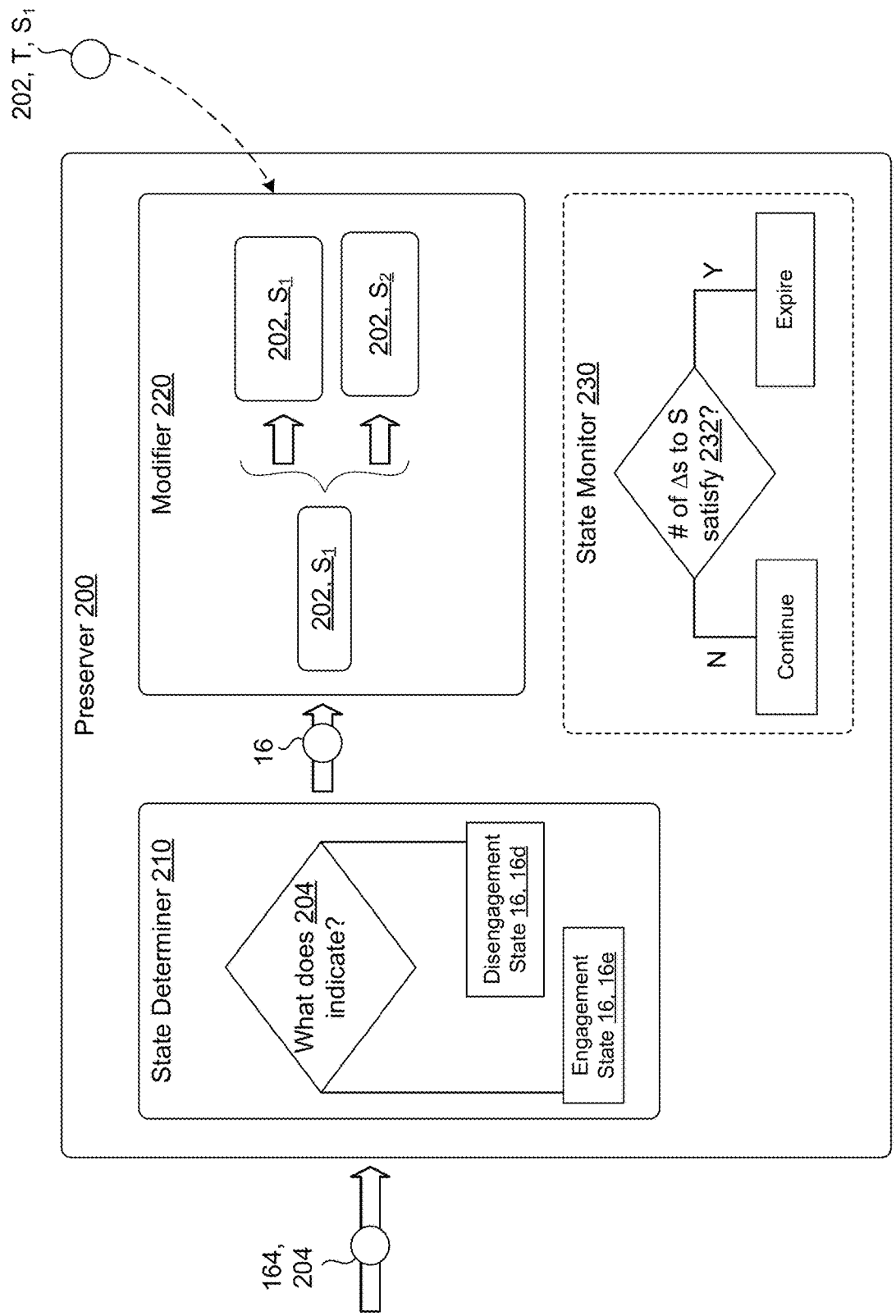
FIGS. 2A and 2B are schematic views of example pre-server for the speech-enabled environment of FIG. 1.
Figure 2B:
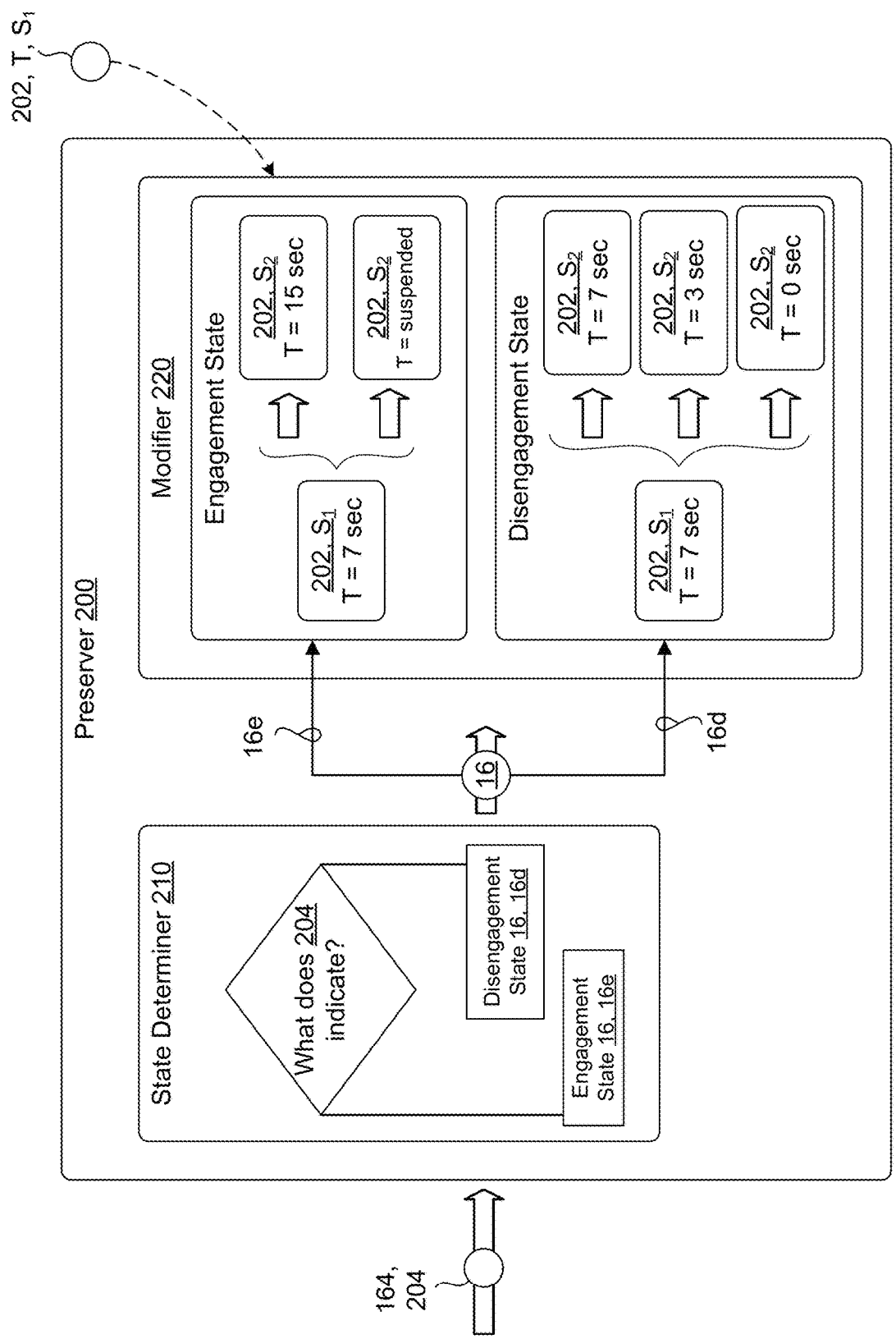

Referring to FIGS. 2A and 2B, the preserver 200 includes a state determiner 210 and a modifier 220. The state determiner 210 is configured to receive one or more contextual signals 204 and to determine a state 16 of a user 10 in relation to the device 110. In some examples, the state determiner 210 receives the sensor data 164 (e.g., raw sensor data) from the sensor system 160 and converts or processes the sensor data 164 into contextual signals 204 that characterize the state 16 of the user 10. For instance, the state determiner 210 receives the sensor data 164 and may characterize a physical state of the user 10 (e.g., a position or an orientation of the user 10) relative to the device 110 based on the sensor data 164 in order to form the contextual signal 204. Additionally or alternatively, the state determiner 210 receives the sensor data 164 and may characterize a non-physical state 16 of the user 10. For example, the state determiner 210 receives acoustic data 164 that characterizes the state 16 of the user 10. To illustrate, the state determiner 210 receives acoustic data 164 that indicates that the user 10 was speaking and paused or slowed her speech in response to the device 110 displaying the temporal GUI element 202. In other words, the user 10 may been having a side speech conversation with another user and noticed that the device 110 displayed a prompt as a temporal GUI element 202. Due to the user 10 noticing the prompt, the user 10 may have slowed her speech in the conversation briefly (i.e., paused momentarily to read or view the prompt) and then continued to carry on in the conversation ignoring the prompt. In this situation, the change in prosody of the acoustic data 164 may be a contextual signal 204 that indicates the state 16 of the user 10. Here, in this illustration, by the user 10 changing the prosody (e.g., rhythm) of her speech, the state determiner 210 may determine that the user 10 is in an engaging state 16e. Then, when the user 10 changes back to the original prosody, the state determiner 210 may determine that the user 10 is in a disengaging state 16d.

In some examples, the contextual signal 204 refers to a perceived change in state 16 of the user 10. That is, the state determiner 210 identifies sensor data 164 from a first instance in time and compares that the sensor data 164 from the first instance in time to sensor data 164 from a second instance in time to determine whether the comparison of sensor data 164 indicates a state change (e.g., a change in location or orientation) for the user 10. Due to the perceived change in state 16 for the user 10, the state determiner 210 may identify whether the change in state 16 indicates that the user 10 is trying to interact with the device 110 in some manner (i.e., engage with the device 110 by interacting with the temporal GUI element 202) or not interact with the device 110. When the change in state 16 for the user 10 indicates that the user 10 is trying to interact with the device 110, the user 10 is then in an engagement state 16a. On the other hand, when the change in state 16 for the user 10 indicates that the user 10 is trying to not interact with the device 110, the user 10 is then in a disengagement state 16d. In some configurations, the state determiner 210 may classify the state 16 of the user 110 with greater granularity than engaged or disengaged. For instance, the state determiner 210 is configured to classify the type of user engagement (e.g., approaching, gesturing in affirmation, speaking confirmation, etc.) or the type of user disengagement (e.g., leaving, gesturing in negation, speaking negatively, etc.)

Once the state determiner 210 identifies the state 16 of the user 10, the state determiner 210 passes the state 16 to the modifier 220. The modifier 220 is configured to modify the state S of the temporal GUI element 202 being displayed on the device 110 based on the state 16 of the user 10. That is, the modifier 220 is able to allow the state S of the temporal GUI element 202 to adapt to the state 16 of the user 10 while the temporal GUI element is being displayed on the device 110. Referring to FIG. 2A, the modifier 210 may change the state S of the temporal GUI element 202 from a first state S, $S_1$ to a second state S, $S_2$ or decide that state S of the temporal GUI element 202 should not change based on the state 16 of the user 10 (e.g., remain the first state $S_1$). The modifier 220 may be configured to change the state S of the temporal GUI element 202 in different ways. In some examples, the modifier 220 modifies or changes the state S of the temporal GUI element 202 by increasing a time (or the time remaining) that the temporal GUI element 202 will be displayed. FIG. 2B depicts that the modifier 220 may increase the timeout value from a time T of seven seconds to a time T of fifteen seconds when the user state 16 is an engagement stage 16e. In other examples, when the user state 16 is an engagement state 16e, the modifier 210 modifies the state S of the temporal GUI element 202 by suspending the timeout feature of the temporal GUI element 202. That is, while the preserver 200 perceives that the user 10 is engaged with the device 110, the modifier 220 enables the temporal GUI element 202 to exist for an indefinite duration (or until the user state 16 changes to a disengaged state 16d).

As also shown in FIG. 2B, the modifier 220 may modify the state S of the temporal GUI element 202 when the user state 16 is a disengaged state 16d. For instance, when the user 10 is in a disengaged state 16d, the modifier 220 accelerates or advances the time remaining until the temporal GUI element 202 times out. Here, FIG. 2B illustrates two situations where this may occur. In the first scenario, when the user state 16 is a disengaged state 16d, the modifier 220 responds by expiring the temporal GUI element 220 on the basis that the user 10 is not interested in engaging with the temporal GUI element 220. This may occur when the user state 16 changes from an engaged state 16e to a disengaged state 16d while the temporal GUI element 202 is being displayed much like the second grocery example where the user 10 stares at the device 110 and then walks away. FIG. 2B illustrates this first scenario by depicting the timeout time T of seven seconds in the first state $S_1$ changing to a timeout time T of zero seconds in the second state $S_2$. In the second scenario, when the user state 16 is a disengaged state 16d, the modifier 220 responds by advancing the time T until the temporal GUI element 220 expires. For example, the modifier 220 changes the timeout time T from seven seconds to three seconds.

In some configurations such as FIG. 2A, the preserver 200 additionally includes a state monitor 230. The state monitor 230 may be configured to monitor and/or regulate a number of times that the state 16 of the user 10 impacts the state S of the temporal GUI element 202. To illustrate why this may be advantageous, the user 10 in the grocery example may finish bringing the groceries in from the car and start putting the groceries away. During this time, the user 10 may be moving back and forth in the kitchen such that the state determiner 210 perceives that the user 10 is engaging and disengaging with the device 110 while the device 110 displays the temporal GUI element 202. Due to this engagement and disengagement, the modifier 220 may be changing the state S of the temporal GUI element 202. For instance, the modifier 220 may be increasing the timeout duration, then decreasing the timeout duration, in some repetitive fashion that mirrors the user's actions. Unfortunately, when this occurs some number of times, it more likely indicates that the temporal GUI element 202 should not be dynamically changed, but rather expired or left to expire because the user 10 would have selected or interacted with the temporal GUI element 202 already. To prevent oscillating state changes or too many state changes from occurring, the monitor 230 may be configured with a state change threshold 232. In some examples, when the number of state changes for the temporal GUI element 202 satisfies the state change threshold 232, the monitor 230 deactivates the modifier 220 with respect to the temporal GUI element 202 or otherwise allow/force the temporal GUI element 202 to expire (e.g., timeout). As the monitor 230 is operating, if the number of state changes for the temporal GUI element 202 does not satisfy the state change threshold 232, the monitor 230 does not prevent the modifier 220 from modifying the temporal GUI element 202 (e.g., the modifier 220 continues to operate).

In some configurations, the monitor 230 is able to adjust one or more thresholds associated with the state determiner 210. For instance, the state determiner 210 may identify a state change for the user 10 based on the user 10 moving from a far field location to a near field location with respect to the device 110. Here, the far field and near field may be delineated by a threshold (e.g., shown in FIG. 3 as threshold 212) that establishes a proximity boundary between the near field and far field. In other words, if the user 10 crosses the threshold moving towards the device 110, the user has entered the near field (e.g., left the far field) while if the user 10 crosses the threshold moving away from the device 110, the user has entered the far field (e.g., left the near field). Yet there are circumstances where the user 10 may be moving back and forth at this boundary. To illustrate, the user 10 may be putting away the groceries from a kitchen island into a fridge and the boundary may be located in between the kitchen island and the fridge. Since the user 10 is likely to be constantly traveling back and forth over this boundary, the monitor 230 may recognize this activity at the threshold and function as a type of debouncer. That is, the user 10 may only be moving a few feet and instead of allowing the state determiner 210 to identify this movement as changing between the engagement state 16e and the disengagement state 16d, the monitor 230 adjusts the threshold to stabilize the state change sensitivity of the state determiner 210. In other words, the user 10 would have to travel further toward the device 110 or away from the device than simply the island to trigger a change of state 16.

FIG. 3 is a scenario that illustrates some types of contextual signals 204 that may characterize the state 16 of the user 10 (e.g., the physical state 16 of the user) at a first time instance $T_0$ and a second time instance $T_1$ that occurs after the first time instance $T_0$. In this scenario, the user 10 walks into the room with the device 110 talking on her mobile phone saying, "I just heard this great song playing on the local radio station, 94.5." In response to this utterance 20 by the user 10, the device 110 generates a prompt as a temporal GUI element 202 that inquires whether the user 10 wants to play the local radio station 94.5. Here, the preserver 200 receives sensor data 164 that corresponds to image data at the first time instance $T_0$ depicting a location of the user 10 relative to the user device 110. With the image data, the state determiner 210 estimates a distance D, $D_1$ between the user 10 and the device 110 at the first time instance $T_0$ based on the received image data to form a contextual signal 204 that characterizes the state 16 of the user 10 in relation to the device 110. Here, a contextual signal 204 that indicates the user's proximity to the device 110 is considered a user-proximity signal. At the first time instance $T_0$, the state determiner 210 identifies that the estimated distance D, $D_1$ means that the user 10 is in the near field at a proximity to the device 110 within the near-far boundary 212. For instance, the state determiner 210 determines that the estimated distance $D_1$ has a distance D to the device 110 that is less than the distance from the device 110 to the boundary 212. Based on the user's proximity to the device 110, the state determiner 210 determines that the user 10 is in an engagement state 16e at the first time instance $T_0$. Since the user-proximity signal indicates that the proximity of the user 10 relative to the device 10 has changed to be closer to the device 10 (e.g., the user 10 walks toward the device 10 in FIG. 3 to be at a first estimated distance $D_1$), the modifier 220 may then modify the state S of the temporal GUI element 202 by, for example, increasing a timeout duration or suspending the timeout duration of the temporal GUI element 202.

Notably, while the temporal GUI element 202 prompt is displayed, the device 110 may initiate fulfillment of the perceived command to play the local radio station 94.5 by initiating a connection with station 94.5 (or a music streaming service capable of streaming station 94.5) and streaming audio therefrom. However, the device 110 may not begin to audibly output the streaming audio until the user 10 affirmatively provides the user input indication indicating selection of the temporal GUI element 202 to stream the audio. Accordingly, in this example, since the user 10 did not direct the speech to the device 110 to stream audio from station 94.5, the device 110 would terminate the streaming connection in response to the temporal GUI element 202 timing out (or the user affirmatively providing an input indication selecting "No") without ever audibly outputting the streaming audio.

Additionally, while examples herein are directed toward the user device 110 generating prompts as temporal GUI elements 202, the user device 110 may similarly output a visual (e.g., light flash) and/or audible (e.g., beep) prompt in a non-obtrusive manner that allows the user to affirm or deny performance of the recognized voice command within the temporal timeout period. For instance, the user 10 could simply speak "yes" or "no". In this scenario, the user device 110 could activate a warm word model that listens for binary terms (e.g., "yes" and "no") in audio.

In addition to allowing the state determiner 210 to generate a user-proximity signal for the contextual signal 202, the sensor data 164 in this scenario also allows the state determiner 210 to generate a contextual signal 204 referred to as an attention detection signal. An attention detection signal refers to a signal that characterizes whether the user 10 is attending to the device 110. An attention detection signal may indicate whether the user 10 is in an engagement state 16e or a disengagement state 16d. In other words, an attention detection signal (e.g., based on sensor data 164) may indicate that the user 10 has changed his or her focus either toward the device 110 or away from the device 110. When the focus of the user 10 changes toward the device 110 while the device 110 displays the temporal GUI element 202, the state determiner 210 may determine that the user 10 is in an engagement state 16e. Some examples that the user 10 is attending to the device 110 include a gaze of the user 10 directed to the device 110, a gesture of the user 10 directed toward the device 110, or a pose/orientation of the user 10 directed toward the device 110 (i.e., faces the device 110). Referring to FIG. 3, the image data captures a gaze of the user 10 that is directed to the device 110 (e.g., shown as dotted vision lines from a face of the user 10). With this attention detection signal 204 indicating that the user 10 is focusing her attention on the device 110, the state determiner 210 determines that the attention detection signal 204 characterizes that the user 10 is in an engagement state 16e at the first time instance $T_0$. Since the attention detection signal alone indicates that the attention of the user 10 is focused on the device 10, the modifier 220 may then modify the state S of the temporal GUI element 202 by, for example, increasing a timeout duration or suspending the timeout duration of the temporal GUI element 202. In some examples, such as this scenario, when multiple contextual signals 204 are available, the preserver 200 may leverage any or all of the contextual signals 204 to determine if the state 16 of the user 10 should impact (e.g., modify) the state S of the temporal GUI element 202.

FIG. 3 also illustrate that the user 10 moves from the first location at a first distance $D_1$ from the device 110 to a second location at a second distance $D_2$ from the device 110 at a second time instance $T_1$. At the second time instance $T_1$, the contextual signals 204 indicate that the user 10 is in a disengaging state 16d where the user 10 does not intend to interact with the temporal GUI element 202. For instance, at the second time instance $T_1$, a user-proximity signal indicates that the user 10 relative to the device 110 has changed to be further from the device 110 and cross the boundary 212 to be in the far field. Furthermore, at the second time instance $T_1$, an attention detection signal indicates that the user 10 has diverted her attention from the device 110. Since both of the contextual signals 204 indicate that the user 10 is in a disengaging state 16d, the modifier 220 may modify the state S of the temporal GUI element 202 (e.g., by advancing or expiring the temporal GUI element 202) or maintain the state S of the temporal GUI element 202 to let it expire accordingly.

Although not shown, instead of the user 10 being located in the far field at the second time instance $T_1$, the user 10 may have left the room completely. In this situation, the state determiner 210 may generate a contextual signal 204 referred to as a presence detection signal. A presence detection signal is a signal that characterizes whether the user 10 is present or not in a particular field of view for one or more sensors 162. In other words, the presence detection signal may function as a binary determination of whether image data or some other form of sensor data 164 indicates the user 10 is present within a field of view of a sensor 162 of the device 110. A presence detection signal may be indicative of a user's state because a change in the presence detection signal may indicate whether the user 10 is performing an action that characterizes the user 10 to be in an engagement state 16e or a disengagement state 16d. For instance, if the user 10 was not present in a field of view of the device 110 (e.g., of a sensor 162 associated with the device 110) and then becomes present in the field of view of the device 110 and this change happens while the temporal GUI element 202 is being displayed on the display 118 of the user device 110, the state determiner 210 may interpret that the change in the user's presence is indicative of the user trying to interact with the temporal GUI element 202. That is, the user 10 has become present to engage with the temporal GUI element 202 such that the state 16 of the user 10 is an engagement state. In the reverse situation, if the user 10 was initially present in a field of view of the device 110 (e.g., of a sensor 162 associated with the device 110) and then is no longer present in the field of view of the device 110 and this change happens while the temporal GUI element 202 is being displayed on the display 118 of the user device 110, the state determiner 210 may interpret that the change in the user's presence is indicative of the user uninterested in interacting with the temporal GUI element 202 (e.g., actively disengaging) such that the state 16 of the user 10 is a disengagement state 16d. When the presence detection signal indicates that the presence of the user 10 within the field of view of the sensor 162 has changed from not present to present, the modifier 220 may then modify the state S of the temporal GUI element 202 by, for example, increasing a timeout duration or suspending the timeout duration of the temporal GUI element 202. In contrast, when the presence detection signal indicates that the presence of the user 10 within the field of view of the sensor 162 has changed from present to not present, the modifier 220 may then modify the state S of the temporal GUI element 202 by, for example, decreasing a timeout duration, immediately expiring the temporal GUI element 202, or maintaining the timeout duration of the temporal GUI element 202 to allow it to expire accordingly.

Figure 4:
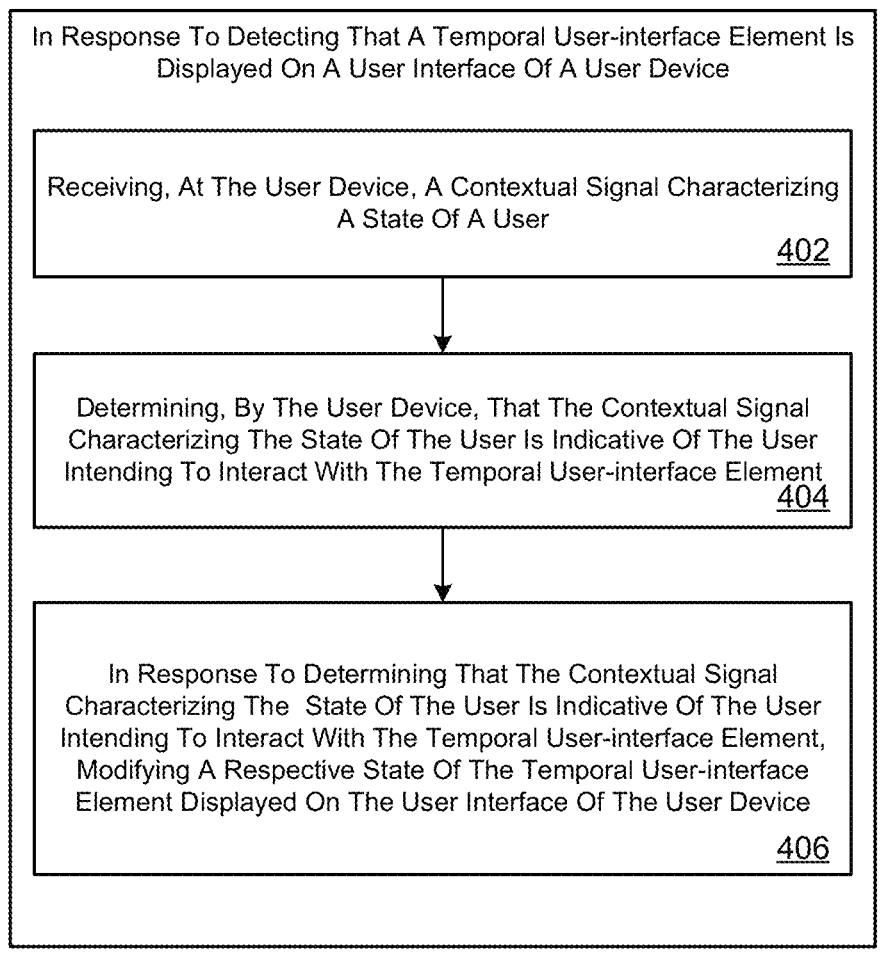
FIG. 4 is a flow chart of an example arrangement of operations for a method of changing a state of a graphical user-interface element.

FIG. 4 is a flowchart of an example arrangement of operations for a method 400 of changing a state of a graphical user-interface element 202. The method 400 performs operations 402-406 in response to detecting that a temporal GUI element 202 displayed on a user interface of a user device 110. At operation 402, the method 400 receives, at the user device 110, a contextual signal 204 characterizing a state 16 of the user 10. At operation 404, the method 400 determines, by the user device 110, that the contextual signal 204 characterizing the state 16 of the user 10 is indicative of the user intending to interact with the temporal GUI element 202. In response to determining that the contextual signal 204 characterizing the state 16 of the user 10 is indicative of the user intending to interact with the temporal GUI element 202, at operations 406, the method 400 modifies a respective state S of the temporal GUI element 202 displayed on the user interface of the user device 110.

FIG. 5 is a schematic view of an example computing device 500 that may be used to implement the systems (e.g., the systems 150, 160, 200) and methods (e.g., method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware 112, 144), memory 520 (e.g., memory hardware 114, 146), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    displaying a temporal user-interface element on a user interface of a user device for a timeout duration, the temporal user-interface element comprising a prompt for a user to initiate fulfillment of a perceived command detected in streaming audio captured by the user device by providing a user input indication indicating selection of the temporal user-interface element while the temporal user-interface element is displayed during the timeout duration;
    in response to detecting that the temporal user-interface element is displayed on the user interface of the user device:
        receiving, at the user device, a contextual signal characterizing a state of a user;
        determining, by the user device, that the contextual signal characterizing the state of the user is indicative of the user intending to interact with the temporal user-interface element; and
        in response to determining that the contextual signal characterizing the state of the user is indicative of the user intending to interact with the temporal user-interface element, modifying the timeout duration of the temporal user-interface element displayed on the user interface of the user device.

2. The method of claim 1, wherein the state of the user comprises an engagement state indicative of the user attempting to engage or engaging with the temporal user-interface element displayed on the user interface of the user device.

3. The method of claim 2, wherein modifying the timeout duration of the temporal user-interface element comprises increasing the timeout duration of the temporal user-interface element.

4. The method of claim 2, wherein modifying the timeout duration of the temporal user-interface element comprises suspending the timeout duration of the temporal user-interface element.

5. The method of claim 1, wherein the state of the user comprises a disengagement state indicative of the user disengaging with the temporal user-interface element displayed on the user interface of the user device.

6. The method of claim 5, wherein, in response to determining that the contextual signal characterizing the state of the user comprises the disengagement state, modifying the timeout duration of the temporal user-interface element comprises removing the temporal user-interface element prior to an expiration of the timeout duration for the temporal user-interface element.

7. The method of claim 5, wherein, in response to determining that the contextual signal characterizing the state of the user comprises the disengagement state, modifying the timeout duration of the temporal user-interface element comprises decreasing the timeout duration of the temporal user-interface element.

8. The method of claim 1, wherein the contextual signal comprises a user-proximity signal indicating a proximity of the user relative to the user device.

9. The method of claim 1, wherein the contextual signal comprises a presence detection signal indicating a presence of the user within a field of view of a sensor associated with the user device.

10. The method of claim 1, wherein the contextual signal comprises an attention detection signal indicating an attention of the user with respect to the user device.

11. The method of claim 1, wherein:
    the contextual signal comprises a presence detection signal indicating a presence of the user within a field of view of a sensor associated with the user device;
    determining that the contextual signal characterizing the state of the user is indicative of the user intending to interact with the temporal user-interface element comprises determining that the presence detection signal indicates that the presence of the user within the field of view of the sensor has changed from not present to present; and
    modifying the timeout duration of the temporal user-interface element displayed on the user interface comprises increasing the timeout duration or suspending the timeout duration of the temporal user-interface element.

12. The method of claim 1, wherein:
the contextual signal comprises a user-proximity signal indicating a proximity of the user relative to the user device;
determining that the contextual signal characterizing the state of the user is indicative of the user intending to interact with the temporal user-interface element comprises determining that the user-proximity signal indicates that the proximity of the user relative to the user device has changed to be closer to the user device; and
modifying the timeout duration of the temporal user-interface element displayed on the user interface comprises increasing the timeout duration or suspending the timeout duration of the temporal user-interface element.

13. The method of claim 1, wherein:
the contextual signal comprises an attention detection signal indicating an attention of the user with respect to the user device;
determining that the contextual signal characterizing the state of the user is indicative of the user intending to interact with the temporal user-interface element comprises determining that the attention detection signal indicates that the attention of the user has changed to focus on the user device; and
modifying the timeout duration of the temporal user-interface element displayed on the user interface comprises increasing the timeout duration or suspending the timeout duration of the temporal user-interface element.

14. A computer-implemented method when executed by data processing hardware causes the data processing hardware to perform operations comprising:
in response to detecting that a temporal user-interface element is displayed on a user interface of a user device:
receiving, at the user device, a contextual signal characterizing a state of a user;
determining, by the user device, that the contextual signal characterizing the state of the user is indicative of the user intending to interact with the temporal user-interface element; and
in response to determining that the contextual signal characterizing the state of the user is indicative of the user intending to interact with the temporal user-interface element:
determining that the respective state of the temporal user-interface element has failed to have been previously modified a threshold number of times within a period of time; and
modifying a respective state of the temporal user-interface element displayed on the user interface of the user device.

15. A system comprising:
data processing hardware; and
memory hardware in communication with the data processing hardware, the memory hardware storing instructions that when executed on the data processing hardware cause the data processing hardware to perform operations comprising:
displaying a temporal user-interface element on a user interface of a user device for a timeout duration, the temporal user-interface element comprising a prompt for a user to initiate fulfillment of a perceived command detected in streaming audio captured by the user device by providing a user input indication indicating selection of the temporal user-interface element while the temporal user-interface element is displayed during the timeout duration;
in response to detecting that the temporal user-interface element is displayed on the user interface of the user device:
receiving, at the user device, a contextual signal characterizing a state of a user;
determining, by the user device, that the contextual signal characterizing the state of the user is indicative of the user intending to interact with the temporal user-interface element; and
in response to determining that the contextual signal characterizing the state of the user is indicative of the user intending to interact with the temporal user-interface element, modifying the timeout duration of the temporal user-interface element displayed on the user interface of the user device.

16. The system of claim 15, wherein the state of the user comprises an engagement state indicative of the user attempting to engage or engaging with the temporal user-interface element displayed on the user interface of the user device.

17. The system of claim 16, wherein modifying the timeout duration of the temporal user-interface element comprises increasing the timeout duration of the temporal user-interface element.

18. The system of claim 16, wherein modifying the timeout duration of the temporal user-interface element comprises suspending the timeout duration of the temporal user-interface element.

19. The system of claim 15, wherein the state of the user comprises a disengagement state indicative of the user disengaging with the temporal user-interface element displayed on the user interface of the user device.

20. The system of claim 19, wherein, in response to determining that the contextual signal characterizing the state of the user comprises the disengagement state, modifying the timeout duration of the temporal user-interface element comprises removing the temporal user-interface element prior to an expiration of the timeout duration for the temporal user-interface element.

21. The system of claim 19, wherein, in response to determining that the contextual signal characterizing the state of the user comprises the disengagement state, modifying the timeout duration of the temporal user-interface element comprises decreasing the timeout duration of the temporal user-interface element.

22. The system of claim 15, wherein the contextual signal comprises a user-proximity signal indicating a proximity of the user relative to the user device.

23. The system of claim 15, wherein the contextual signal comprises a presence detection signal indicating a presence of the user within a field of view of a sensor associated with the user device.

24. The system of claim 15, wherein the contextual signal comprises an attention detection signal indicating an attention of the user with respect to the user device.

25. The system of claim 15, wherein:
the contextual signal comprises a presence detection signal indicating a presence of the user within a field of view of a sensor associated with the user device;
determining that the contextual signal characterizing the state of the user is indicative of the user intending to interact with the temporal user-interface element comprises determining that the presence detection signal indicates that the presence of the user within the field of view of the sensor has changed from not present to present; and modifying the timeout duration of the temporal user-interface element displayed on the user interface comprises increasing the timeout duration or suspending the timeout duration of the temporal user-interface element.

26. The system of claim 15, wherein:

the contextual signal comprises a user-proximity signal indicating a proximity of the user relative to the user device;

determining that the contextual signal characterizing the state of the user is indicative of the user intending to interact with the temporal user-interface element comprises determining that the user-proximity signal indicates that the proximity of the user relative to the user device has changed to be closer to the user device; and modifying the timeout duration of the temporal user-interface element displayed on the user interface comprises increasing the timeout duration or suspending the timeout duration of the temporal user-interface element.

27. The system of claim 15, wherein:

the contextual signal comprises an attention detection signal indicating an attention of the user with respect to the user device;

determining that the contextual signal characterizing the state of the user is indicative of the user intending to interact with the temporal user-interface element comprises determining that the attention detection signal indicates that the attention of the user has changed to focus on the user device; and modifying the timeout duration of the temporal user-interface element displayed on the user interface comprises increasing the timeout duration or suspending the timeout duration of the temporal user-interface element.

28. A system comprising:

data processing hardware; and memory hardware in communication with the data processing hardware, the memory hardware storing instructions that when executed on the data processing hardware cause the data processing hardware to perform operations comprising:

in response to detecting that a temporal user-interface element is displayed on a user interface of a user device:

receiving, at the user device, a contextual signal characterizing a state of a user:

determining, by the user device, that the contextual signal characterizing the state of the user is indicative of the user intending to interact with the temporal user-interface element; and in response to determining that the contextual signal characterizing the state of the user is indicative of the user intending to interact with the temporal user-interface element:

determining that the respective state of the temporal user-interface element has failed to have been previously modified a threshold number of times within a period of time; and modifying a respective state of the temporal user-interface element displayed on the user interface of the user device.

* * * * *